US010333372B2

(12) United States Patent
Sugiura

(10) Patent No.: US 10,333,372 B2
(45) Date of Patent: Jun. 25, 2019

(54) DISTURBANCE AVOIDING COVER

(71) Applicant: DENSO CORPORATION, Kariya, Aichi-pref. (JP)

(72) Inventor: Hiroyasu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 369 days.

(21) Appl. No.: 15/014,108

(22) Filed: Feb. 3, 2016

(65) Prior Publication Data
US 2016/0294258 A1 Oct. 6, 2016

(30) Foreign Application Priority Data

Mar. 31, 2015 (JP) .................................. 2015-71621

(51) Int. Cl.
*B62D 25/20* (2006.01)
*H02K 11/33* (2016.01)
*H02K 11/01* (2016.01)
*H02K 5/04* (2006.01)

(52) U.S. Cl.
CPC ............. *H02K 11/33* (2016.01); *H02K 11/01* (2016.01); *H02K 5/04* (2013.01)

(58) Field of Classification Search
CPC ........ H02K 11/33; H02K 11/01; H02K 11/00; H02K 5/04; H02K 5/00; B62D 21/15; B62D 21/155; B62D 21/00; B62D 25/20; B62D 25/2018; B62D 25/2072; B62D 25/24
See application file for complete search history.

(56) References Cited

U.S. PATENT DOCUMENTS

| | | | | |
|---|---|---|---|---|
| 5,390,754 A * | 2/1995 | Masuyama | ............. | B60K 1/04 105/51 |
| 6,188,574 B1 * | 2/2001 | Anazawa | ................. | B60K 1/04 180/68.5 |
| 6,483,719 B1 * | 11/2002 | Bachman | ............. | H05K 9/003 174/378 |
| 6,484,592 B2 * | 11/2002 | Sezaki | ................... | G01L 3/102 73/862.335 |
| 6,662,891 B2 * | 12/2003 | Misu | ....................... | B60K 1/04 180/65.1 |
| 6,666,289 B2 * | 12/2003 | Shimizu | ................... | B60K 6/40 180/53.1 |
| 8,079,435 B2 * | 12/2011 | Takasaki | ................. | B60K 1/04 180/65.1 |
| 8,246,106 B2 * | 8/2012 | Boczek | ................... | F41H 7/044 296/148 |
| 8,333,259 B2 * | 12/2012 | Matsuda | ................ | H02K 29/08 180/443 |

(Continued)

FOREIGN PATENT DOCUMENTS

JP S58-105825 A 6/1983
JP 2004-150931 A 5/2004

(Continued)

*Primary Examiner* — James M Dolak

(57) ABSTRACT

A body is located between a protected component and a disturbing object and is inclined relative to a vertical direction. The protected component is located outside an interior of a vehicle. The body includes a lowermost portion in the vertical direction. The lowermost portion has a foreign matter discharge portion. An upper side of the protected component in the vertical direction is at least partially exposed from the body.

17 Claims, 10 Drawing Sheets

(56) References Cited

U.S. PATENT DOCUMENTS

| | | | |
|---|---|---|---|
| 8,636,093 B2* | 1/2014 | Sotoyama | B62D 21/152 |
| | | | 180/312 |
| 8,701,503 B2* | 4/2014 | Shimizu | B62D 6/10 |
| | | | 73/862.333 |
| 8,746,782 B2* | 6/2014 | Naoi | B62D 25/10 |
| | | | 180/69.1 |
| 9,356,494 B2* | 5/2016 | Motoda | H02K 5/225 |
| 9,415,809 B2* | 8/2016 | Wu | B62D 25/2072 |
| 10,040,487 B2* | 8/2018 | Kabayama | B62D 21/08 |
| 10,056,801 B2* | 8/2018 | Falguier | H02K 5/20 |
| 10,155,442 B2* | 12/2018 | Gong | B62D 5/0418 |
| 10,167,023 B2* | 1/2019 | Schneider | B62D 25/20 |
| 2012/0031697 A1 | 2/2012 | Matsuda | |
| 2016/0202087 A1 | 7/2016 | Kadoike et al. | |

FOREIGN PATENT DOCUMENTS

| | | |
|---|---|---|
| JP | 2006-160110 A | 6/2006 |
| JP | 3132766 U | 6/2007 |

* cited by examiner

← FRONT SIDE    REAR SIDE →

US 10,333,372 B2

DISTURBANCE AVOIDING COVER

CROSS REFERENCE TO RELATED APPLICATION

This application is based on reference Japanese Patent Application No. 2015-71621 filed on Mar. 31, 2015, the disclosure of which is incorporated herein by reference.

TECHNICAL FIELD

The present disclosure relates to a disturbance avoiding cover.

BACKGROUND

Conventionally, a known technology employs a magnetic sensor to detect a rotary angle of a motor. For example, Patent Document 1 discloses a configuration including two pairs of lead wires. In Patent Document 1, lead wires in the same phase are equipped centered on a magnetic sensor to be point symmetric to each other. In this way, the configuration cancels leakage of magnetic flux, which is caused by an electric current flowing in the lead wires, thereby to enhance detection accuracy of the rotary angle detected with the magnetic sensor.

(Patent Document 1)

Publication of unexamined Japanese patent application No. 2012-039737

Patent Document 1 may enable to cancel the influence of leakage of the magnetic flux caused by an electric current flowing in the lead wires. However, Patent Document 1 may not consider influence of a magnetic field from an external object outside the device.

SUMMARY

It is an object of the present disclosure to produce a disturbance avoiding cover configured to protect a protected component from disturbance such as influence of a magnetic field.

According to an aspect of the disclosure, a disturbance avoiding cover comprises a body located between a protected component and a disturbing object and inclined relative to a vertical direction. The protected component is located outside an interior of a vehicle. The body includes a lowermost portion in the vertical direction. The lowermost portion has a foreign matter discharge portion. An upper side of the protected component in the vertical direction is at least partially exposed from the body.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a disturbance avoiding cover according to the disclosure will be described with reference to drawings.

First Embodiment

Figure 1:
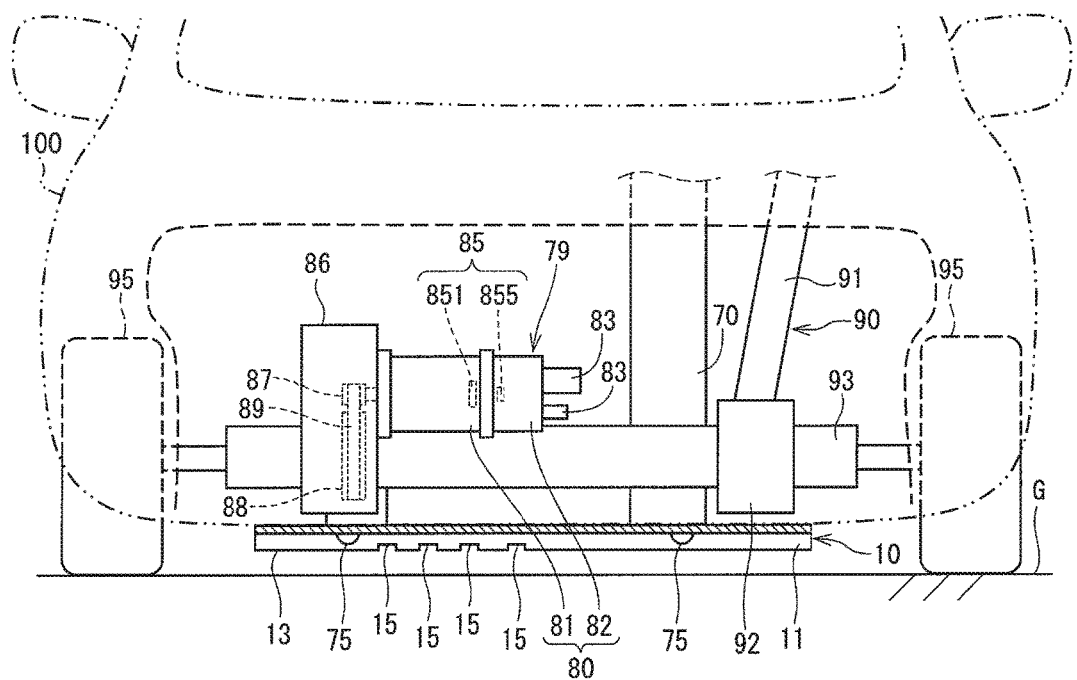
FIG. 1 is a sectional view showing a disturbance avoiding cover according to a first embodiment of the present disclosure.
Figure 2:
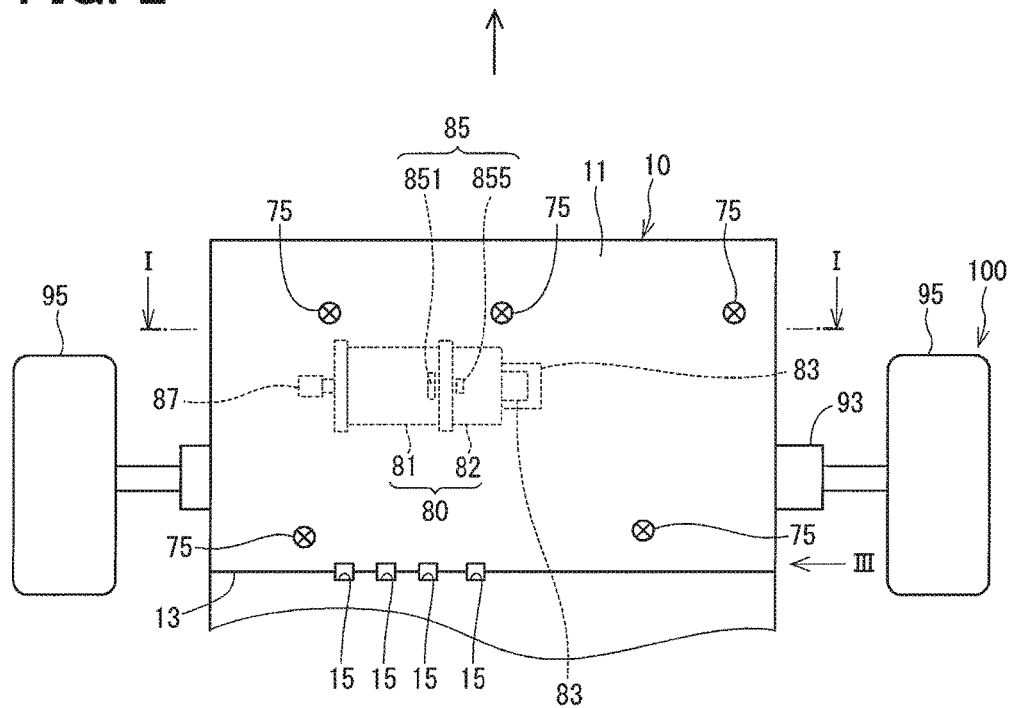
FIG. 2 is a plan view showing the disturbance avoiding cover according to the first embodiment of the present disclosure when being viewed from the lower side in the vertical direction.
Figure 3:
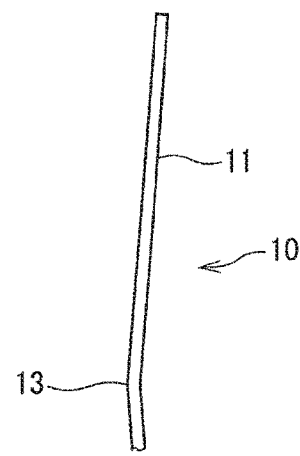
FIG. 3 is a view viewed along an arrow III in FIG. 2.

FIGS. 1 to 3 show a disturbance avoiding cover according to a first embodiment of the present disclosure. It is noted that, FIGS. 1 to 3 are schematic drawings and may not strictly depict actual dimensional relationships of the device. The same may be applied to drawings according to subsequent embodiment(s). The disturbance avoiding cover 10 protects an actuator device 80 from disturbance. The actuator device 80 may function as a protected component. The actuator device 80 is employed in an electronic power-steering device 79. The electric power-steering device 79 is equipped in a vehicle 100 for assisting a steering wheel operation of a driver.

FIG. 1 shows a configuration of a steering wheel system 90 equipped with an electronic power steering device 79. FIG. 1 schematically shows a section taken along the line I-I in FIG. 2. The steering wheel system 90 includes a steering handle (steering device/steering wheel, not shown), a steering shaft 91, a pinion gear 92, a rack axis 93, wheels 95, an electronic power steering device 79, and the like. The steering shaft 91 is connected with the steering handle. The pinion gear 92 is equipped to an end of the steering shaft 91 on the opposite side of the steering handle. The pinion gear 92 is meshed with the rack axis 93. A pair of the wheels 95 is connected with both ends of the rack axis 93, respectively, via a tie rod and/or the like.

When a driver rotates the steering handle, the steering shaft 91, which is connected to the steering handle, rotates. The pinion gear 92 converts a rotary motion of the steering shaft 91 into a linear motion of the rack axis 93. The pair of wheels 95 is steered by an angle according to a displacement of the rack axis 93.

The electronic power steering device 79 includes the actuator device 80, reduction-gears 88, and the like. The actuator device 80 is equipped with a motor 81, a control unit 82, and the like. The reduction-gears 88 reduce rotation of the motor 81 and transmits the reduced rotation to the rack axis 93. That is, the electronic power steering device 79 according to the present embodiment has a rack-assist configuration. The actuator device 80 is located in an engine room, which is outside an interior of the vehicle 100. The actuator device 80 is located at a portion close to a ground surface G. In the present embodiment, the actuator device 80 is located such that an axial direction of the actuator device 80 is substantially in parallel with the rack axis 93. In other words, the actuator device 80 is located such that the axial direction of the actuator device 80 is substantially perpendicular to a traveling direction of the vehicle 100. It is noted that, the arrangement of the actuator device 80 such that the direction, the loading portion, and/or the like of the actuator device 80 may differ from those of the example of FIG. 1.

The motor 81 includes a stator, a rotor, a shaft, and/or the like (not shown). A magnet 851 is equipped to an end of the shaft on the side of the control unit 82. The magnet 851 rotates integrally with the shaft. The shaft has an end on the opposite of the control unit 82, and the end of the shaft is equipped with an output end 87. The output end 87 is exposed from a motor case. A belt 89 is wound around the output end 87 and the reduction gears 88. The present structure transmits rotation of the motor 81 to the reduction gears 88. The output end 87, the reduction gears 88, and the belt 89 are accommodated in a gearbox 86.

The control unit 82 is substantially coaxial with one side of the motor 81 in the axial direction. The control unit 82 includes a rotary angle sensor 855, a processing unit (not shown), a connector 83, and the like. The rotary angle sensor 855 detects rotation of the motor 81. The processing unit executes various processings related to control of the motor 81. The connector 83 is used for connection with a battery, various sensors, and/or the like. The rotary angle sensor 855 is equipped at a portion opposed to the magnet 851. The magnet 851 and the rotary angle sensor 855 form a sensor portion 85. In the present embodiment, the rotary angle sensor 855 may function as a sensor element.

The disturbance avoiding cover 10 is located on a lower side of the actuator device 80 in a vertical (gravitational) direction. The disturbance avoiding cover 10 is located between the actuator device 80 and the ground surface G. In the present embodiment, the ground surface G may corresponds to a disturbing object. The disturbance avoiding cover 10 is affixed to a cover support member 70 by using a fastener member 75 such as a screw and/or the like. The cover support member 70 is equipped to a chassis of the vehicle 100 and/or the like.

A body 11 of the disturbance avoiding cover 10 is formed of a magnetic material such as a ferrous material substantially in a plate shape. The actuator device 80 on the upper side in the vertical direction is entirely exposed from the body 11. That is, a portion of the actuator device 80 on the opposite side of the ground surface G is entirely exposed from the body 11. The body 11 is inclined relative to the vertical direction (refer to FIG. 3). The body 11 has a lowermost portion 13 on the lower side in the vertical direction. The lowermost portion 13 has lower openings 15 as a foreign matter discharge portion. As shown in FIG. 2, the lower openings 15 are formed in a region, which does not overlap with a region formed by projecting the actuator device 80 toward the lower side in the vertical direction. In particular, the lower openings 15 may be formed, for example, at a position, which does not overlap with a sensor portion projected region Rs, which is formed by projecting the sensor portion 85. In FIG. 2 the sensor portion projected region Rs is not illustrated. In the present embodiment, the number of the lower openings 15 is four.

In the present embodiment, the disturbance avoiding cover 10 is equipped between the actuator device 80 and the ground surface G. The present configuration may enable to restrict a stepping stone and/or the like from colliding against the actuator device 80 while the vehicle is travelling. Therefore, the present configuration may further enable to protect the actuator device 80 from corrosion resulting from damage caused on the surface of a body of the actuator device 80 due to collision with a stepping stone and/or the like. In addition, the present configuration may restrict the actuator device 80 from increase in temperature cause by thermal radiation from the ground surface G.

The body 11 is inclined relative to the vertical direction. The body 11 has the lower openings 15 in the lowermost portion 13. Therefore, even when foreign matters, such as liquid, solid, and/or the like, intrudes to an upper side of the body 11 in the vertical direction, the body 11 is enabled to discharge the foreign matters through the lower openings 15. The present configuration may enable to avoid influence caused by accumulation of foreign matters in the disturbance avoiding cover 10 on the side of the actuator device 80. The lower openings 15 may be formed on the rear side of the vehicle relative to the actuator device 80. The present configuration may enable desirable aeration. The disturbance avoiding cover 10 may be formed of a magnetic material thereby to enable to reduce influence of a magnetic field from the ground surface G. Influence of a magnetic field from the ground surface G may be caused by, for example, non-contact electric charge.

It may be assumable to employ a configuration, in which the actuator device 80 itself enables to reduce influence of disturbance caused by, for example, foreign matters, such as a stepping stone, heat and/or a magnetic field from an external object. However, in such a configuration, the weight of the product may increase. In addition, in such a configuration, difficulty of design for the product and/or a manufacturing cost for the product may increase. It may be assumable to use the actuator device 80 in, for example, an electronic power steering device having a column-assist-type configuration. Such a configuration may not need a structure to reduce influence of disturbance exerted onto the actuator device 80. Therefore, in such a configuration, the disturbance avoiding cover 10 may be redundant for the device. In consideration of this, according to the present embodiment, the disturbance avoiding cover 10 is equipped separately from the actuator device 80. That is, the actuator device 80 may be equipped without the disturbance avoiding cover 10. In this way, the structure of the actuator device 80 is simplified to enhance flexibility of the actuator device 80.

As described above in detail, the disturbance avoiding cover 10 according to the present embodiment is equipped between the actuator device 80 and the ground surface G. The actuator device 80 is equipped in the engine room outside the interior of the vehicle 100. In addition, the disturbance avoiding cover 10 includes the body 11 inclined relative to the vertical direction. The body 11 has the lowermost portion 13 in the vertical direction. The lowermost portion 13 has the lower openings 15. At least a part of the actuator device 80 on the opposite side of the ground surface G is exposed from the body 11.

The present configuration may enable to protect the actuator device 80 from disturbance, such as a magnetic field, heat, foreign matters, and/or the like, from the disturbing object. In addition, the disturbance avoiding cover 10 may be a separate component from the actuator device 80. The present configuration may enable to simplify the structure of the actuator device 80, compared with a structure in which the actuator device 80 itself protects its interior from influence of disturbance, such as a magnetic field, heat, foreign matter, and/or the like, from a disturbing object.

In addition, the body 11 is inclined relative to the vertical direction, and the body 11 has the lower openings 15 at the lowermost portion 13. The present configuration may enable to discharge foreign matters to the outside of the body 11 appropriately, even when foreign matters intrude into a portion of the body 11 on the side of the actuator device 80. Furthermore, at least a part of the actuator device 80 on the upper side in the vertical direction is exposed from the body 11. That is, the disturbance avoiding cover 10 is at least partially opened on the upper side and the lower side in the vertical direction. The present configuration may enable to ensure an aeration path on the side of the actuator device 80 relative to the disturbance avoiding cover 10. Therefore, the present configuration may enable to restrict increase in temperature of the disturbance avoiding cover 10 on the side of the actuator device 80.

The actuator device 80 includes the sensor portion 85 to detect change in a magnetic field. The actuator device 80 includes the motor 81 and the control unit 82. The control unit 82 controls actuation of the motor 81. The sensor portion 85 includes the magnet 851 and the rotary angle sensor 855. The magnet 851 is rotational integrally with the shaft of the motor 81. The rotary angle sensor 855 detects a rotational magnetic field caused by the magnet 851. The body 11 is formed of a magnetic material. The present configuration may enable to reduce influence of the magnetic field from the ground surface G toward the actuator device 80. Therefore, the present configuration may enable the sensor portion 85 to retain a detection accuracy of the magnetic field.

The lower openings 15 are formed at a position, which does not overlap with the sensor portion projected region Rs. The sensor portion projected region Rs is formed by projecting the sensor portion 85 in the direction toward the ground surface G. The present configuration may enable to reduce influence from the disturbing object on the sensor portion 85. For example, the present configuration may reduce influence of a magnetic field.

Second Embodiment

Figure 4:
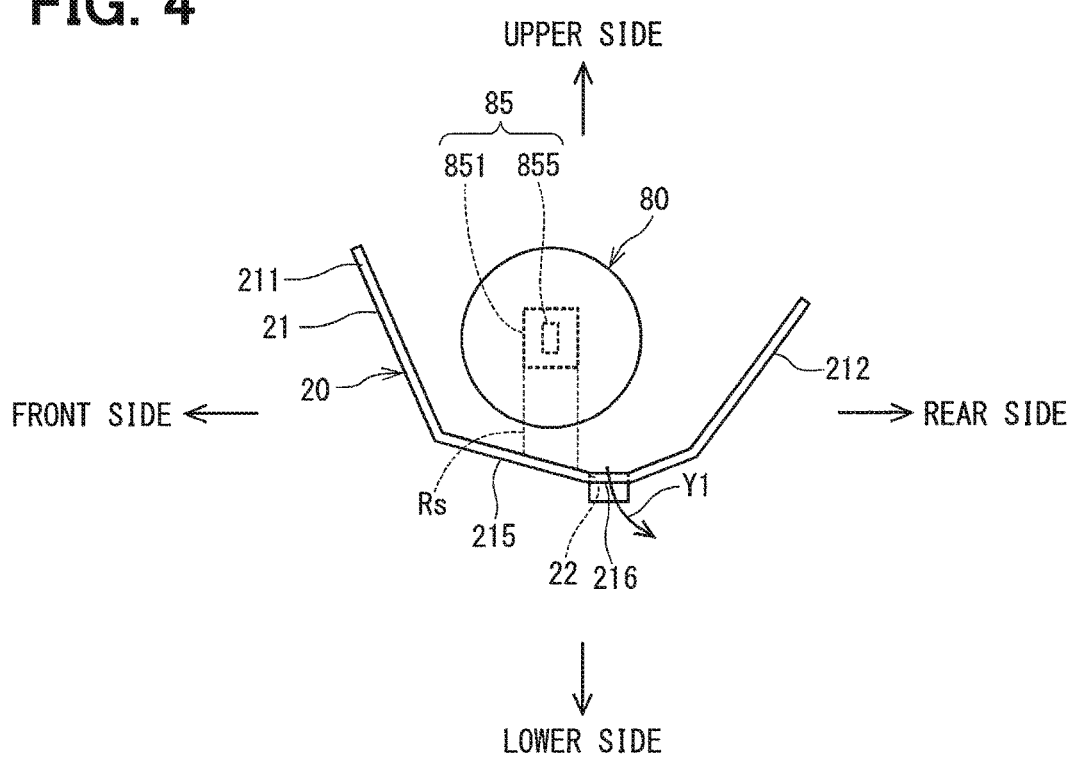
FIG. 4 is a side view showing a disturbance avoiding cover according to a second embodiment of the present disclosure.

The second embodiment of the present disclosure will be described with reference to FIG. 4. In the following embodiments, the actuator device 80 and the disturbance avoiding cover will be mainly described. A body 21 of a disturbance avoiding cover 20 according to the present embodiment includes a front wall portion 211, a rear wall portion 212, and a lower wall portion 215. The body 21 is opened on the upper side in the vertical direction. The actuator device 80 on the opposite side of the ground surface G is exposed from the body 21. The front wall portion 211 is equipped on the front side of the vehicle relative to the actuator device 80. The rear wall portion 212 is equipped on the rear side of the vehicle relative to the actuator device 80.

The lower wall portion 215 is inclined relative to the vertical direction. Lower openings 22 are formed as the foreign matter discharge portion in a lowermost portion 216. In the present embodiment, each of the lower openings 22 are formed substantially in a rectangular shape. The lower opening 22 is formed by cutting three sides of an outer periphery of a portion of the lowermost portion 216, which corresponds to the lower opening 22, and bending the portion toward the lower side in the vertical direction. FIG. 4 is a side view in which the lower opening 22 is not visible directly. In FIG. 4, the portion of the lowermost portion 216, which forms the lower opening 22, is shown by dashed lines for explanation of the lower opening 22. Similar explanatory indication is applied to subsequent drawings such as FIG. 5. As shown by the arrow Y1, foreign matters, which intrude into the body 21 on the side of the actuator device 80, is discharged through the lower opening 22.

In the present embodiment, the lower opening 22 is formed at a position, which does not overlap with the sensor portion projected region Rs. The sensor portion projected region Rs is formed by projecting the sensor portion 85 toward the lower side in the vertical direction. In addition, the lower opening 22 is formed at the position, which is on the rear side of the vehicle relative to the sensor portion projected region Rs. The present configuration may produce an effect similarly to the above-described embodiment.

Third Embodiment

Figure 5:
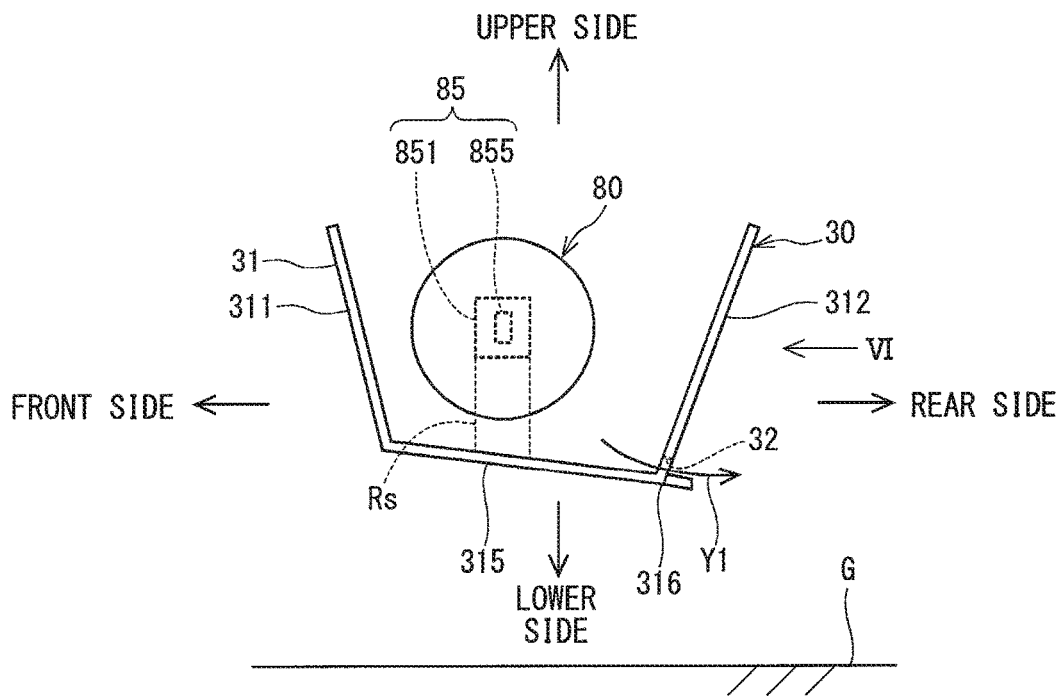
FIG. 5 is a side view showing a disturbance avoiding cover according to a third embodiment of the present disclosure.
Figure 6:
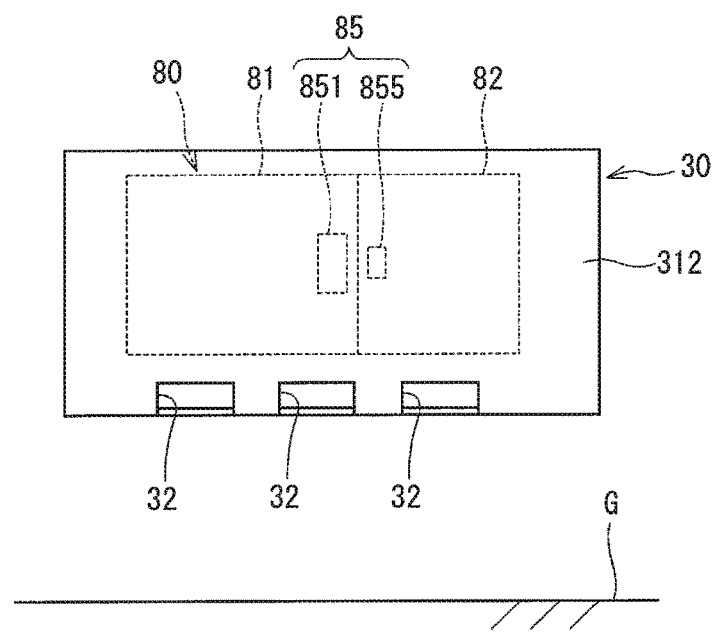
FIG. 6 is a view viewed along an arrow VI in FIG. 5.

The third embodiment of the present disclosure will be described with reference to FIGS. 5 and 6. A body 31 of a disturbance avoiding cover 30 according to the present embodiment includes a front wall portion 311, a rear wall portion 312, and a lower wall portion 315. The body 31 is opened on the upper side in the vertical direction. The actuator device 80 on the opposite side of the ground surface G is exposed from the body 21. The front wall portion 311 and the rear wall portion 312 are substantially the same as the front wall portion 211 and the rear wall portion 212 of the second embodiment, respectively. The lower wall portion 315 is inclined relative to the vertical direction such that a lowermost portion 316 is located at the rearmost side of the vehicle 100. Lower openings 32 are formed as the foreign matter discharge portion in the lowermost portion 316. In the present embodiment, the rear wall portion 312 is cut on the side of the lowermost portion 316 thereby to form the lower openings 32. As shown in FIG. 6, in the present embodiment, three lower openings 32 are formed. As shown in FIG. 5, the lower openings 32 are formed at positions on the rear side of the vehicle relative to the sensor portion projected region Rs. The lower openings 32 are formed at the positions, which do not overlap with the sensor portion projected region Rs. The present configuration may produce an effect similarly to the above-described embodiments.

Fourth Embodiment

Figure 7:
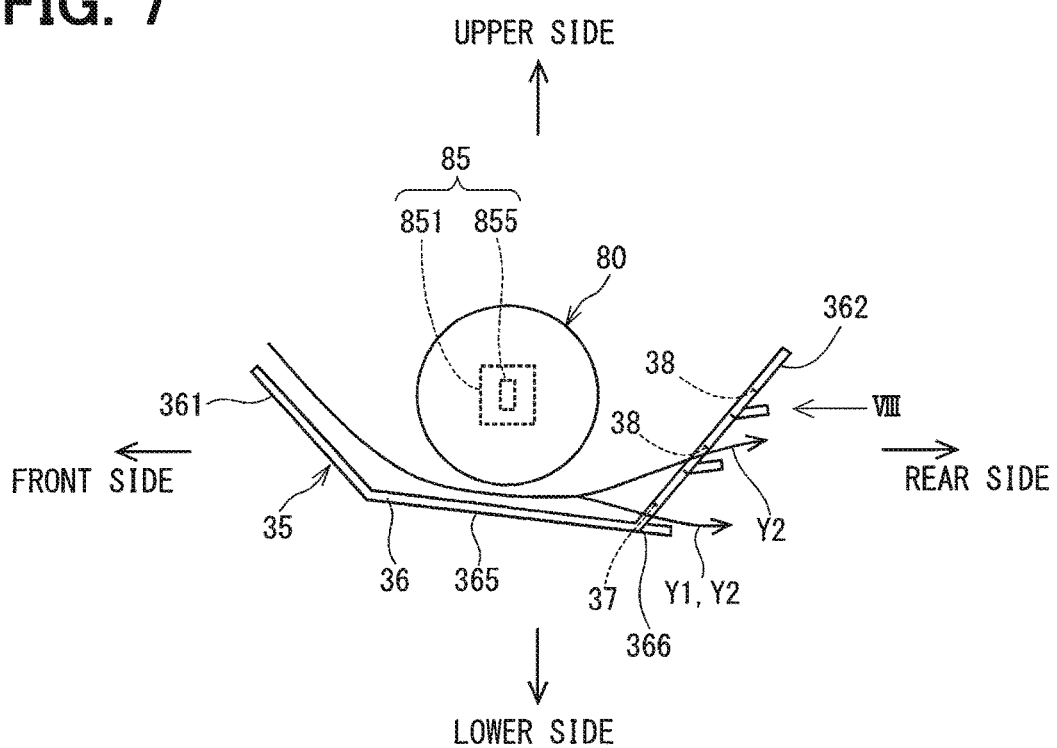
FIG. 7 is a side view showing a disturbance avoiding cover according to a fourth embodiment of the present disclosure.
Figure 8:
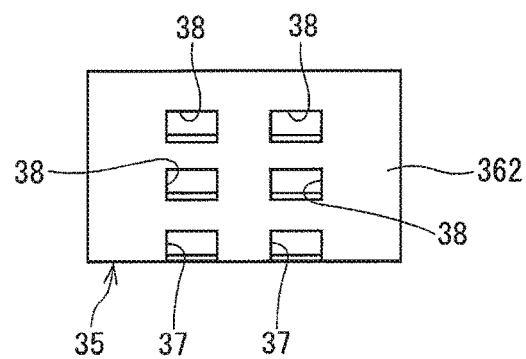
FIG. 8 is a view viewed along an arrow VIII in FIG. 7.

The fourth embodiment of the present disclosure will be described with reference to FIGS. 7 and 8. According to the present embodiment, a body 36 of a disturbance avoiding cover 35 includes a front wall portion 361, a rear wall portion 362, and a lower wall portion 365. The body 36 is opened on the upper side in the vertical direction. The actuator device 80 on the opposite side of the ground surface G is exposed from the body 36. The front wall portion 361 and the lower wall portion 365 are substantially the same as the front wall portion 311 and the lower wall portion 315 of the third embodiment, respectively. A lowermost portion 366 has a portion on the rearmost side of the vehicle 100, and the portion has lower openings 37, which are similar to the lower openings 32 of the third embodiment.

The rear wall portion 362 has vent openings 38 on the upper side of the lower openings 37 in the vertical direction. As shown in FIG. 8, in the present embodiment, the rear wall portion 362 has six openings in total. The six openings include two lower openings 37 and four vent openings 38. The lower openings 37 are used as both the foreign matter discharge portion and a vent opening.

The lower openings 37 and the vent openings 38 are formed in the rear wall portion 362 thereby to facilitate, as shown by arrows Y2, wind to flow from the front side of the vehicle toward the rear side of the vehicle. Thus, the lower openings 37 and the vent openings 38 may facilitate wind to flow on the side of the actuator device 80 relative to the disturbance avoiding cover 35. The present configuration may enable to enhance heat dissipation property of the actuator device 80. In a case where wind does not flow sufficiently on the side of the actuator device 80 relative to the disturbance avoiding cover 35, due to, for example, the shape of the disturbance avoiding cover 35, a vent opening may be formed additionally in the front wall portion 361.

In the present embodiment, the vent openings 38 are formed in the body 36 on the rear side of the vehicle 100. The present configuration facilitates to cause an air current on the side of the actuator device 80 relative to the body 36, when the vehicle 100 travels, thereby to restrict increase in temperature of the body 36 on the side of the actuator device 80. The present configuration may produce an effect similarly to the above-described embodiments.

Fifth Embodiment

Figure 9:
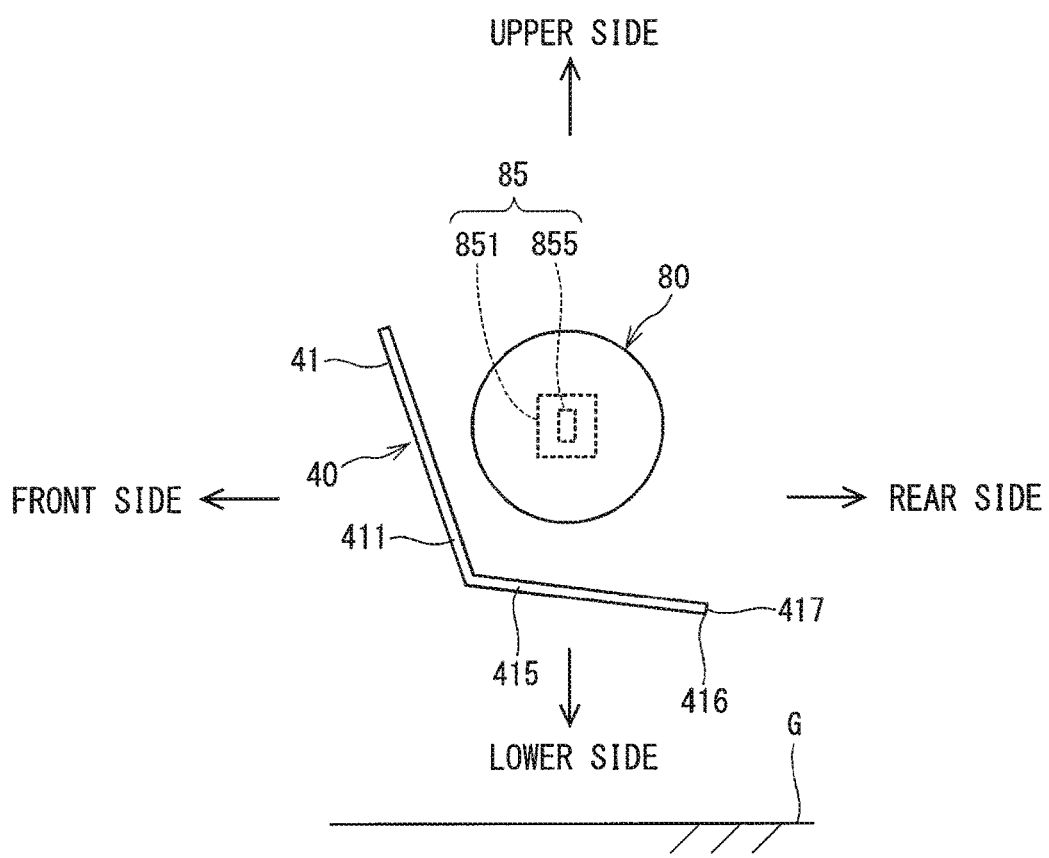
FIG. 9 is a side view showing a disturbance avoiding cover according to a fifth embodiment of the present disclosure.

The fifth embodiment of the present disclosure will be described with reference to FIG. 9. A body 41 of a disturbance avoiding cover 40 according to the present embodiment includes a front wall portion 411 and a lower wall portion 415. The body 41 is opened on the upper side in the vertical direction. The actuator device 80 on the opposite side of the ground surface G is exposed from the body 41. The front wall portion 411 and the lower wall portion 415 of the present embodiment are substantially the same as the front wall portion 311 and the lower wall portion 315 of the third embodiment. In the present embodiment, the rear wall portion is omitted. That is, in the present embodiment, a rear end 417, which is a lowermost portion 416 of the lower wall portion 415, is opened. In the present embodiment, the rear end 417 is utilized as the foreign matter discharge portion. Even when foreign matters intrude into a space formed by the disturbance avoiding cover 40 and located on the side of the actuator device 80, the foreign matters may be discharged through the rear end 417 to the outside. The present configuration may produce an effect similarly to the above-described embodiment.

Sixth Embodiment

Figure 10:
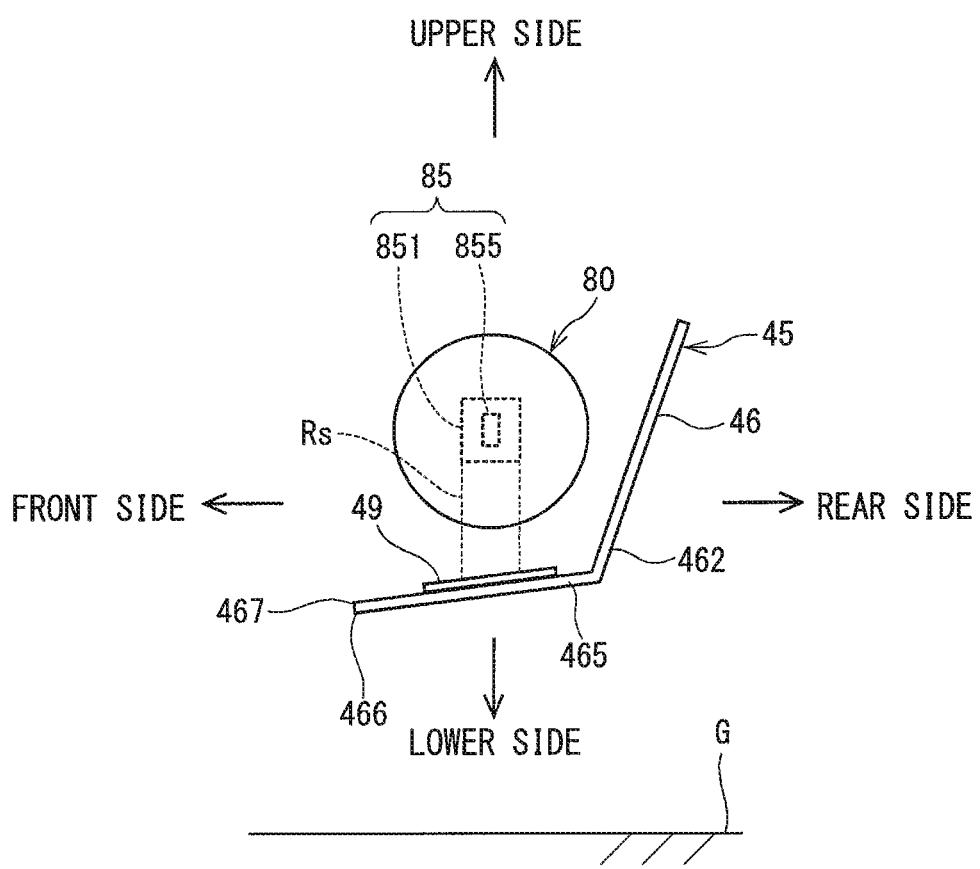
FIG. 10 is a side view showing a disturbance avoiding cover according to a sixth embodiment of the present disclosure.

The sixth embodiment of the present disclosure will be described with reference to FIG. 10. A body 46 of a disturbance avoiding cover 45 according to the present embodiment includes a rear wall portion 462 and a lower wall portion 465. The body 46 is opened on the upper side in the vertical direction. The actuator device 80 on the opposite side of the ground surface G is exposed from the body 41. The rear wall portion 462 is equipped to the rear side of the vehicle relative to the actuator device 80. The lower wall portion 465 is inclined relative to the vertical direction, such that a front end 467 coincides with a lowermost portion 466. In the present embodiment, the front wall portion is omitted. In addition, the front end 467 of the lower wall portion 465 is opened. In the present embodiment, the front end 467 is utilized as the foreign matter discharge portion.

In the present embodiment, the body 46 is formed of a nonmagnetic material such as resin. In addition, the body 46 is equipped with a magnetic seal 49. The magnetic seal 49 covers the sensor portion projected region Rs, which is formed by projecting the sensor portion 85 toward the ground surface G. The present configuration may enable to reduce influence of a magnetic field from the ground surface G on the sensor portion 85. In addition, the present configuration may enable to enhance flexibility of selection of a material for forming the body 46. For example, the body 46 may be formed of a relatively lightweight material such as resin. In this way, the disturbance avoiding cover 45 may have a light-weight configuration. The present configuration may produce an effect similarly to the above-described embodiment.

Seventh Embodiment

Figure 11:
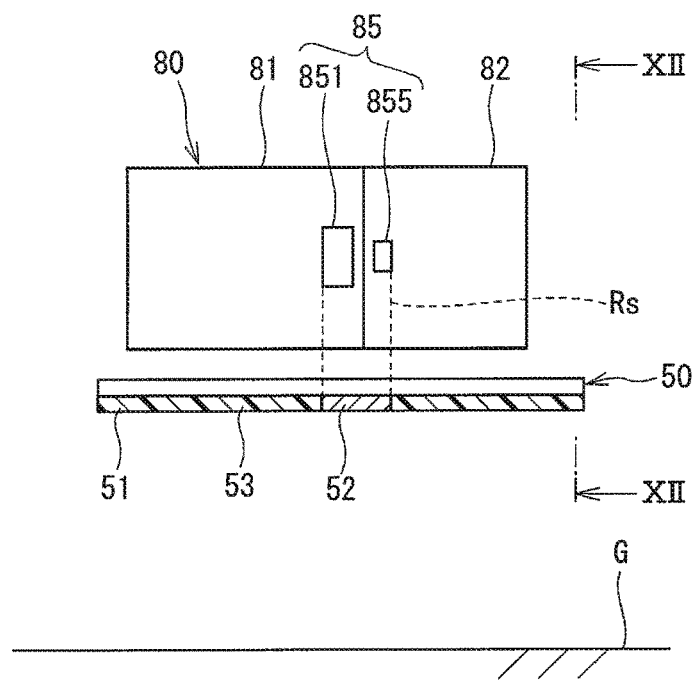
FIG. 11 is a sectional view taken along a line XI-XI in FIG. 12, FIG. 11 showing a disturbance avoiding cover according to a seventh embodiment of the present disclosure.
Figure 12:
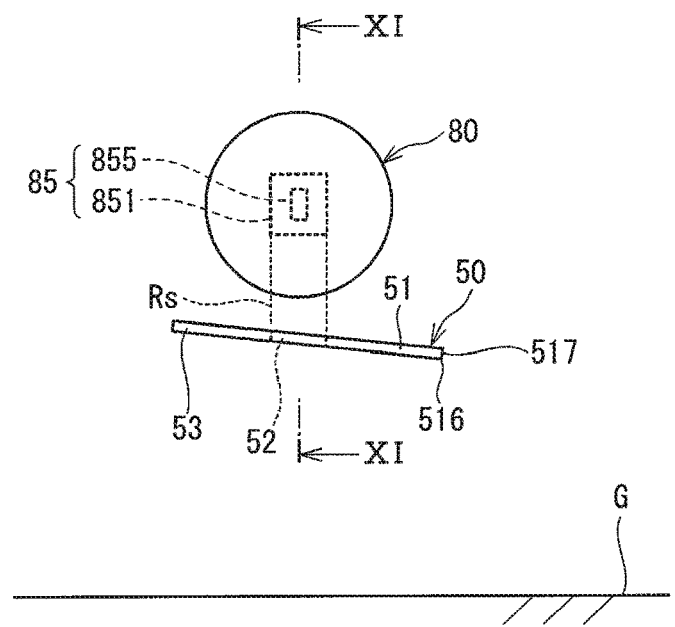
FIG. 12 is a sectional view taken along a line XII-XII in FIG. 11.

The seventh embodiment of the present disclosure will be described with reference to FIGS. 11 and 12. It is noted that, FIG. 11 shows a cross section taken along the line XI-XI in FIG. 12. A hatch pattern representing a cross section of the actuator device 80 is omitted in order to simplify the drawing. In FIG. 12, a hatch pattern representing a cross section of a disturbance avoiding cover 50 is omitted. In the present embodiment, a body 51 of the disturbance avoiding cover 50 includes a magnetism shielding portion 52 and a peripheral portion 53. The magnetism shielding portion 52 is formed of a magnetic material such as a ferrous material. The peripheral portion 53 may be formed of various kinds of materials. The peripheral portion 53 may be formed of, for example, a nonmagnetic resin. The magnetism shielding portion 52 and the peripheral portion 53 are integrally formed by, for example, insert molding and/or the like.

The body 51 is located such that the magnetism shielding portion 52 covers the sensor portion projected region Rs, which is formed by projecting the sensor portion 85 toward the lower side in the vertical direction. The present configuration may enable to reduce influence of a magnetic field from the lower side in the vertical direction on the sensor portion 85. As shown in FIG. 12, the body 51 is inclined relative to the vertical direction, such that a rear end 517 coincides with a lowermost portion 516. The rear end 517 is an end on the rear side of the vehicle. In the present embodiment, the rear end 517 is utilized as the foreign matter discharge portion. The body 51 is opened on the upper side in the vertical direction. The actuator device 80 on the opposite side of the ground surface G is exposed from the body 51.

In the present embodiment, the magnetism shielding portion 52 is formed of a magnetic material. In addition, the peripheral portion 53, which is formed in outside the magnetism shielding portion 52, is formed of a material, which is different from the material of the magnetism shielding portion 52. The present configuration may enable to reduce influence of a magnetic field from the ground surface G on the sensor portion 85. In addition, the present configuration may enable to enhance flexibility of selection of a material for forming the peripheral portion 53. For example, the peripheral portion 53 may be formed of a relatively light-weight material such as resin. In this way, the disturbance avoiding cover 50 may have a light-weight configuration. The present configuration may produce an effect similarly to the above-described embodiment.

Eighth Embodiment

Figure 13:
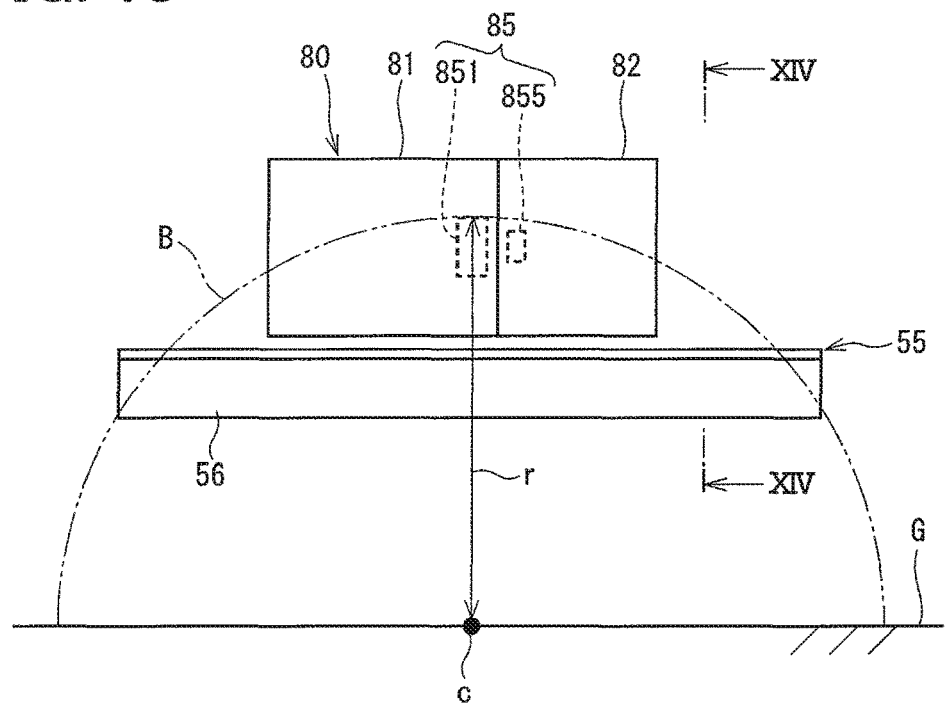
FIG. 13 is a side view showing a disturbance avoiding cover according to an eighth embodiment of the present disclosure.
Figure 14:
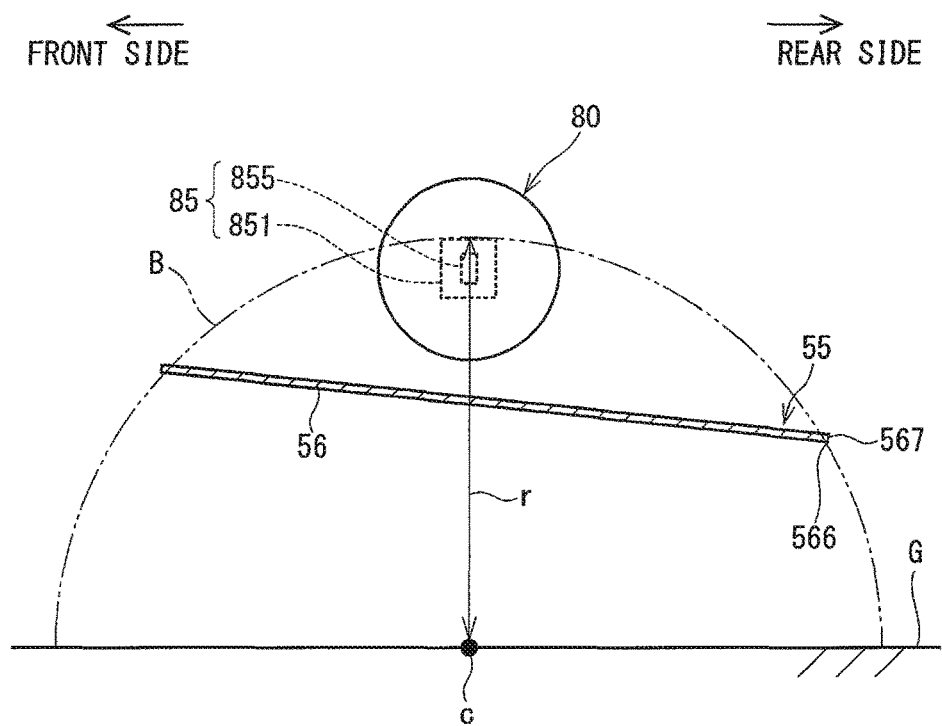
FIG. 14 is a sectional view taken along a line XIV-XIV in FIG. 13.

The eighth embodiment of the present disclosure will be described with reference to FIGS. 13 and 14. A body 56 of a disturbance avoiding cover 55 of the present embodiment is formed of a magnetic material. The body 56 is inclined relative to the vertical direction such that a rear end 567 coincides with a lowermost portion 566. The rear end 567 is an end on the rear side of the vehicle. In the present embodiment, the rear end 567 is utilized as the foreign matter discharge portion. The body 56 is opened on the upper side in the vertical direction. The actuator device 80 on the opposite side of the ground surface G is exposed from the body 56.

The sensor portion 85 has an end on the side of opposite of the ground surface G, and the end is at a distance r from the ground surface G. An imaginary hemisphere B having a radius r is centered on a center c. The center c coincides with an intersection between the ground surface G and a straight line, which extends from a center of the sensor portion 85 to the ground surface G in the vertical direction. The body 56 divides the imaginary hemisphere B into a portion on the side of the actuator device 80 and a portion on the side of the ground surface G. An outer periphery of the body 56 is located outside the imaginary hemisphere B. The present configuration may enable to reduce influence of a magnetic field on the sensor portion 85 from directions excluding the vertical direction. The present configuration may produce an effect similarly to the above-described embodiment.

Ninth Embodiment

Figure 15:
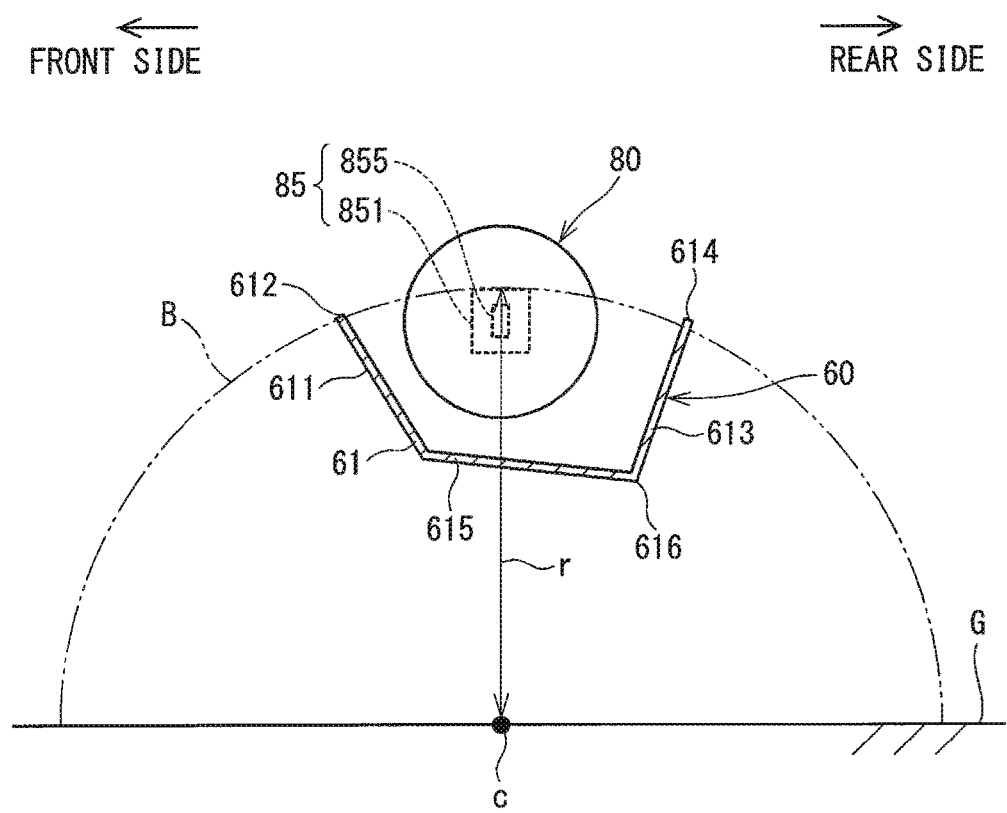
FIG. 15 is a side view showing a disturbance avoiding cover according to a ninth embodiment of the present disclosure.

The ninth embodiment of the present disclosure will be described with reference to FIG. 15. FIG. 15 is corresponds to FIG. 14 of the eighth embodiment. A body 61 of a disturbance avoiding cover 60 according to the present embodiment includes a front wall portion 611, a rear wall portion 613, and a lower wall portion 615. The body 61 is opened on the upper side in the vertical direction. The actuator device 80 is exposed on the opposite side of the ground surface G from the body 61. The front wall portion 611 is equipped on the front side of the vehicle relative to the actuator device 80. The rear wall portion 613 is equipped on the rear side of the vehicle relative to the actuator device 80. The lower wall portion 615 is inclined relative to the vertical direction, such that the rearmost side of the vehicle 100 coincides with a lowermost portion 616. It is noted that, the lower opening, which is similar to that of the third embodiment, is formed in the body 61. In FIG. 15, illustration of the lower opening is omitted.

In the present embodiment, the front wall portion 611 has an upper end portion 612, which is an end on the opposite side of the ground surface G. In addition, the rear wall portion 613 has an upper end portion 614, which is an end on the opposite side of the ground surface G. The ground surface G is a disturbing object. In the present embodiment, the upper end portion 612 and the upper end portion 614 are located on the opposite side of the imaginary hemisphere B from the ground surface G. The present configuration may enable the disturbance avoiding cover 60 to divide the imaginary hemisphere B into a portion on the side of the actuator device 80 and a portion on the side of the ground surface G. The present configuration may enable to reduce influence of a magnetic field on the sensor portion 85 from directions excluding the vertical direction (vertical direction), similarly to the eighth embodiment. The present configuration may produce an effect similarly to the above-described embodiment.

Tenth Embodiment to Twelfth Embodiment

The tenth to twelfth embodiments of the present disclosure will be described with reference to FIGS. 16A to 16C. In the above embodiments, the disturbing object is the ground surface G. In the tenth to twelfth embodiments, the disturbing object is a high-temperature object 69. The high-temperature object 69 is a component, which is at a higher temperature than a temperature of the actuator device 80 even temporarily. The high-temperature object 69 may be, for example, an engine, an exhaust pipe, and/or the like.

Figure 16A:
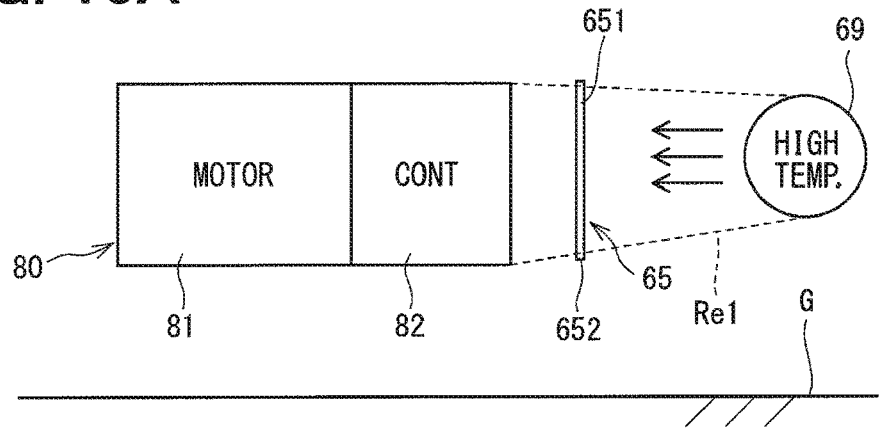
FIGS. 16A to 16C are side views showing tenth to twelfth embodiments of the present disclosure, respectively.

As shown in FIG. 16A, a body 651 of the disturbance avoiding cover 65 according to the tenth embodiment is equipped substantially perpendicularly to the ground surface G. In addition, the actuator device 80 is exposed on the upper side in the vertical direction from the body 651. A feature of the foreign matter discharge portion will be supplemented. In an assumable configuration, in which the body 651 is equipped horizontally to the ground surface G, foreign matters residing between the body 651 and the actuator device 80 may not be discharged. Nevertheless, in the assumable configuration, the body 651 may be located not to be in parallel with the ground surface G, such that the body 651 is in a state excluding being horizontal. In this state, the lowermost portion may be opened to enable to discharge foreign matters. In view of this configuration and effect, the state, in which an object is substantially perpendicular to the ground surface G, may be incorporated in a concept, in which an object is inclined relative to the vertical direction. It is further noted that, in the present embodiment, the body 651 is substantially perpendicular to the ground surface G, and therefore, foreign matters may hardly accumulate in a space formed by the disturbance avoiding cover 65 on the side of the actuator device 80. Even though, the lower end 652 of the body 651 may be used as the foreign matter discharge portion.

In the present embodiment, the body 651 of the disturbance avoiding cover 65 is equipped between the actuator device 80 and the high-temperature object 69. In the present configuration, a region, which is formed by connecting the outer periphery of the high-temperature object 69 with the outer periphery of the actuator device 80, defines a high-temperature radiation region Re1. The body 651 of the present embodiment divides the high-temperature radiation region Re1 into a portion on the side of the actuator device 80 and a portion on the side of the high-temperature object 69. That is, the outer periphery of the body 651 is located outside the high-temperature radiation region Re1. The disturbance avoiding cover 65 is formed of a heat-resistant material, which is resistible to temperature increased by exposure to heat dissipation from the high-temperature object 69. The eleventh embodiment and the twelfth embodiment may employ a similar heat-resistant material.

Figure 16B:
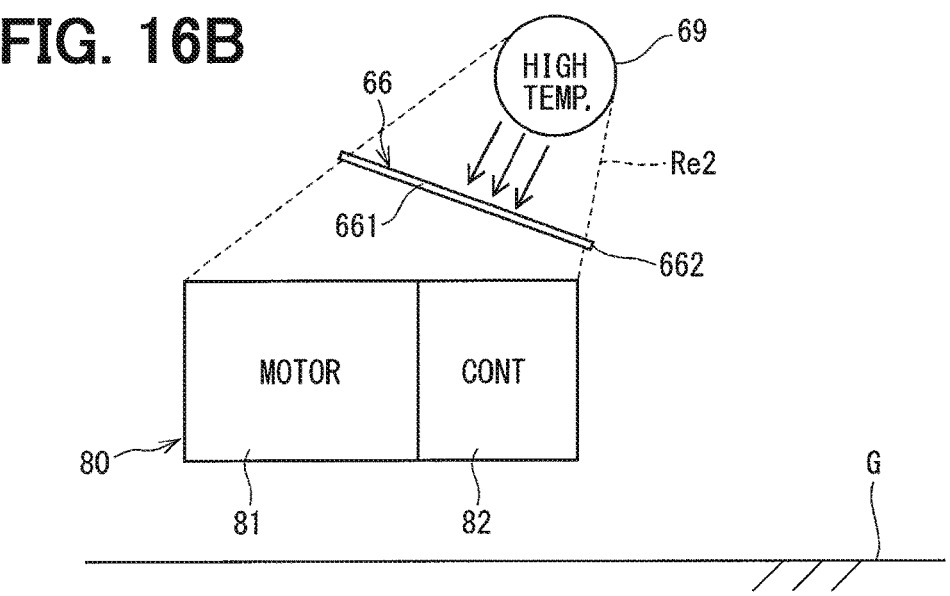

As shown in FIG. 16B, a body 661 of a disturbance avoiding cover 66 according to the eleventh embodiment is inclined relative to the vertical direction. A lower end 662 of the disturbance avoiding cover 66 is used as the foreign matter discharge portion. In addition, the actuator device 80 is exposed on the upper side in the vertical direction from the body 661. In the present embodiment, the high-temperature object 69 is equipped on the upper side of the actuator device 80 in the vertical direction. The body 661 is equipped to divide a high-temperature radiation region Re2 into a portion on the side of the actuator device 80 and a portion on the side of the high-temperature object 69. The high-temperature radiation region Re1 or Re2 are divided with the disturbance avoiding cover 65 or 66 into the portions on the side of the actuator device 80 and the portions on the side of the high-temperature object 69. In this way, the present configurations may enable to restrict the actuator device 80 from increase in temperature due to heat dissipation from the high-temperature object 69.

Figure 16C:
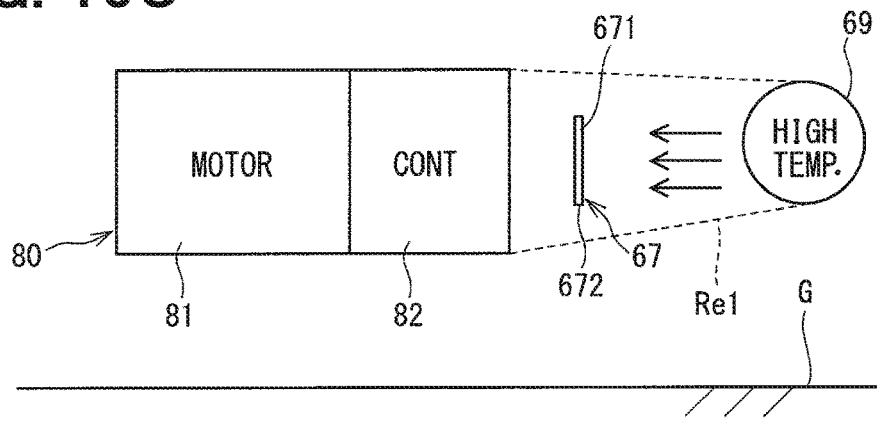

The twelfth embodiment shown in FIG. 16C is a modification of the tenth embodiment. A body 671 of a disturbance avoiding cover 67 of the present embodiment is equipped substantially perpendicularly to the ground surface G. A lower end 672 of the disturbance avoiding cover 67 is used as the foreign matter discharge portion. In addition, the actuator device 80 is exposed on the upper side in the vertical direction from the body 671. The body 671 is equipped between the actuator device 80 and the high-temperature object 69 to cover a part of the high-temperature radiation region Re1. That is, an outer periphery of the body 671 resides inside the high-temperature radiation region Re1. In the present embodiment, the disturbance avoiding cover 67 covers a part of the high-temperature radiation region Re1. The present configuration may also enable to restrict the actuator device 80 from increase in temperature due to heat dissipation from the high-temperature object 69.

In the tenth to the twelfth embodiments, the disturbing object is the high-temperature object 69, which is at a temperature higher than the temperature of the actuator device 80. In the tenth and eleventh embodiments, the body 651 or 661 divides the high-temperature radiation region Re1 or Re2, which connects the outer periphery of the high-temperature object 69 with the outer periphery of the actuator device 80, into the portion on the side of the actuator device 80 and the portion on the side of the high-temperature object 69. The present configuration may enable to restrict the actuator device 80 from increase in temperature due to heat dissipation from the high-temperature object 69. The present configuration may produce an effect similarly to the above-described embodiment.

(a) Disturbance Avoiding Cover

In the above-described first to fifth embodiments and eighth to ninth embodiments, the disturbance avoiding cover is formed of a magnetic material. The disturbance avoiding cover according to the sixth to seventh embodiments and according to the tenth to twelfth embodiments may be formed of a magnetic material.

In the sixth embodiment, the body is formed of a nonmagnetic material and equipped with the magnetic seal. The body of the disturbance avoiding cover according to the above-described embodiments other than the sixth embodiment may be formed of a nonmagnetic material equipped with the magnetic seal.

In the seventh embodiment, the magnetism shielding portion is formed of a magnetic material, which is different from a material of the peripheral portion. The disturbance avoiding cover according to the embodiments other than the seventh embodiment may be equipped with the magnetism shielding portion and the peripheral portion.

It is noted that, in an assumable configuration, the disturbance avoiding cover is equipped on the lower side of the protected component in the vertical direction. In this assumable configuration, disturbance caused by a magnetic field from the ground surface may not be taken into consideration, and the disturbance avoiding cover may be simply required to protect the protected component from physical impact such as a stepping stone. In this case, the disturbance avoiding cover may be entirely formed of a nonmagnetic material, without equipment of the magnetic seal and/or the like.

In the tenth to twelfth embodiments, the disturbance avoiding cover is formed of a heat-resistant material. The disturbance avoiding cover of the first to ninth embodiments may be formed of a material, which has a heat-resistant property.

In the above-described embodiments, the disturbance avoiding cover is formed such that the protected component is opened on the upper side entirely in the vertical direction. In another embodiment, the disturbance protective cover may be opened on the upper side of the protected component in the vertical direction to a certain degree to enable aeration. For example, the disturbance avoiding cover may cover the protected component on the upper side in the vertical direction. In addition, the disturbance avoiding cover may have vent openings, which are similar to the vent openings described in the fourth embodiment, in a surface on the upper side in the vertical direction.

The first embodiment exemplifies the four lower openings, the third embodiment exemplifies the three openings, and the fourth embodiment exemplifies the two openings. In another embodiment, the number of the lower opening(s) may be one or may be five or more.

In the above-described embodiments, the disturbance avoiding cover is screwed to the cover support member. In another embodiment, the disturbance avoiding cover may be affixed to the cover support member by using another method than the screwing.

(b) Protected Component

In the above embodiments, the protected component is an actuator device having a machine-electronics integrated configuration including the motor and the control unit integrated with each other. In another embodiment, the protected component is not limited to an actuator device. The protected component may be, for example, only a motor or only a control unit. The protected component is not limited to an actuator device including a motor. The protected component may be various kinds of components requiring protection from disturbance. In the above-described embodiments, the actuator device is employed as the protected component in the electronic power steering device. In another embodiment, the protected component may be employed in another devices than an electronic power steering device.

(c) Disturbing Object

In the first to ninth embodiments, the disturbing object is the ground surface. The disturbing object may be a device and/or the like, which causes magnetic flux leakage. In the above embodiments, the number of the disturbing object is one to the one protected component. Specifically, the number of the disturbing object is the ground surface or the high-temperature object. It is noted that, in the second embodiment, the high-temperature object is located on the side of the front wall portion or on the side of the rear wall portion. In another embodiment, for example, similarly to the configuration of the second embodiment, one disturbance protective cover may protect the protected component from multiple kinds of disturbing objects, such as a magnetic field, heat, foreign matters, and/or the like.

The disturbance avoiding cover according to the present disclosure is located between the protected component and the disturbing object. The protected component is located outside the vehicle interior of the vehicle. The disturbance avoiding cover includes the body inclined relative to the vertical direction. The foreign matter discharge portion is formed in the lowermost portion of the body in the vertical direction. The protected component on the upper side in the vertical direction is at least partially exposed from the body.

The present configuration may enable to protect the protected component from the disturbing object such as a magnetic field, a heat source, foreign matters, and or the like. In addition, the disturbance avoiding cover is a separate component from the protected component. In this way, the configuration of the protected component may be simplified, compared with a configuration in which the protected component itself protects its interior from influence from the disturbing object such as a magnetic field, a heat source, foreign matters, and or the line.

In addition, the foreign matter discharge portion is formed in the lowermost portion of the body, which is inclined relative to the vertical direction. In this way, even when foreign matters intrude into the space formed by the body on the side of the protected component, foreign matters can be appropriately discharged to the outside of the body.

The protected component on the upper side in the vertical direction is at least partially exposed from the body.

That is, the disturbance avoiding cover is at least partially opened on the upper side and the down side in the vertical direction.

The present configuration may enable to ensure the aeration path in the space formed by the disturbance avoiding cover on the side of the protected component. Therefore, the present configuration may enable to restrict the protected component on the side of the disturbance avoiding cover from increase in temperature.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A disturbance avoiding cover for a vehicle, the disturbance avoiding cover located between a road surface and a protected component outside of an interior of the vehicle, the disturbing avoiding cover comprising:
    a body including a first portion and a second portion that are connected to each other at, and decline to, a bending portion to have a valley shape at a lowermost portion of the body in a vertical direction, wherein
    the bending portion has a foreign matter discharge portion, and
    an upper side of the protected component in the vertical direction is exposed from the body.
2. The disturbance avoiding cover according to claim 1, wherein
    the protected component includes a sensor portion that detects change in a magnetic field.
3. The disturbance avoiding cover according to claim 2, wherein
    the protected component is an actuator device including a motor, a control unit, and the sensor portion,
    the control unit controls actuation of the motor, and
    the sensor portion includes
        a magnet rotatable integrally with a shaft of the motor, and
        a sensor element that detects a rotational magnetic field of the magnet.
4. The disturbance avoiding cover according to claim 2, wherein
    the body includes a magnetism shielding portion and a peripheral portion,
    the magnetism shielding portion is formed in a sensor portion projected region, which is formed by projecting the sensor portion toward the disturbing object,
    the peripheral portion is formed outside the magnetism shielding portion,
    the magnetism shielding portion is formed of a magnetic material, and
    the peripheral portion is formed of a material, which is different from the material of the magnetism shielding portion.
5. The disturbance avoiding cover according to claim 2, wherein
    the body is formed of a nonmagnetic material,
    the body is equipped with a magnetic seal, which covers the sensor portion projected region, and
    the sensor portion projected region is formed by projecting the sensor portion toward the disturbing object.
6. The disturbance avoiding cover according to claim 2, wherein
    the body is formed of a magnetic material.
7. The disturbance avoiding cover according to claim 6, wherein
    the sensor portion has an end on an opposite side of the disturbing object,
    the end of the sensor portion is at a distance from the disturbing object,
    the disturbing object and a line, which extends from a center of the sensor portion toward the disturbing object, has an intersection,
    an imaginary hemisphere having a radius, which is the same as the distance, is centered on the intersection, and
    the body divides the imaginary hemisphere into a portion on a side of the protected component and a portion on a side of the disturbing object.
8. The disturbance avoiding cover according to claim 2, wherein
    the foreign matter discharge portion is located at a position, which does not overlap with a sensor portion projected region, and
    the sensor portion projected region is formed by projecting the sensor portion toward the disturbing object.
9. The disturbance avoiding cover according to claim 1, wherein
    the disturbing object is a high-temperature object, which is configured to be at a higher temperature than a temperature of the protected component.
10. The disturbance avoiding cover according to claim 9, wherein the body divides a high-temperature radiation region into a portion on a side of the protected component and a portion on a side of the high-temperature object, and the high-temperature radiation region is defined by connecting an outer periphery of the high-temperature object with an outer periphery of the protected component.

11. The disturbance avoiding cover according to claim 1, wherein the body has a vent opening on a rear side of the vehicle.

12. The disturbance avoiding cover according to claim 1, wherein the foreign matter discharge portion is formed at a position not overlapping with the protected component along the vertical direction.

13. The disturbance avoiding cover according to claim 1, wherein the protected component is an actuator device including a motor and a sensor portion that detects a rotation of the motor, and the foreign matter discharge portion is formed at a position not overlapping with the sensor portion along the vertical direction.

14. The disturbance avoiding cover according to claim 1, wherein the foreign matter discharge portion is positioned behind the protected component in a front-rear direction of the vehicle.

15. The disturbance avoiding cover according to claim 1, wherein the first portion and the second portion of the body have a V-shape.

16. The disturbance avoiding cover according to claim 1, wherein the bending portion extends linearly along a direction perpendicular to the vertical direction.

17. The disturbance avoiding cover according to claim 16, wherein the foreign matter discharge portion is a plurality of openings, and the plurality of openings are arranged along the bending portion.

\* \* \* \* \*